US008849051B2

(12) United States Patent
Jia

(10) Patent No.: US 8,849,051 B2
(45) Date of Patent: *Sep. 30, 2014

(54) DECODING VARIABLE LENGTH CODES IN JPEG APPLICATIONS

(75) Inventor: Wei Jia, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 1129 days.

This patent is subject to a terminal disclaimer.

(21) Appl. No.: 11/901,605

(22) Filed: Sep. 17, 2007

(65) Prior Publication Data

US 2009/0074314 A1   Mar. 19, 2009

(51) Int. Cl.
*G06K 9/46* (2006.01)
*G06K 9/36* (2006.01)
*H04N 19/91* (2014.01)
*H04N 19/625* (2014.01)
*H04N 19/70* (2014.01)
*H04N 19/44* (2014.01)

(52) U.S. Cl.
CPC ... *H04N 19/00533* (2013.01); *H04N 19/00951* (2013.01); *H04N 19/00812* (2013.01); *H04N 19/00884* (2013.01)
USPC ........................................ 382/246

(58) Field of Classification Search
CPC .............................. H04N 19/00533
See application file for complete search history.

(56) References Cited

U.S. PATENT DOCUMENTS

| 5,163,136 A | 11/1992 | Richmond |
| 5,189,671 A | 2/1993 | Cheng |
| 5,289,548 A | 2/1994 | Wilson et al. |
| 5,585,931 A | 12/1996 | Juri et al. |
| 5,774,206 A | 6/1998 | Wasserman et al. |
| 5,796,743 A | 8/1998 | Bunting et al. |
| 5,818,529 A | 10/1998 | Asamura et al. |
| 5,821,886 A | 10/1998 | Son |
| 5,881,176 A | 3/1999 | Keith et al. |
| 5,969,750 A | 10/1999 | Hsieh et al. |
| 5,990,812 A | 11/1999 | Bakhmutsky |
| 6,008,745 A | 12/1999 | Zandi et al. |
| 6,009,203 A | 12/1999 | Liu et al. |
| 6,023,088 A | 2/2000 | Son |

(Continued)

FOREIGN PATENT DOCUMENTS

| CN | 101017574 A | 2/2007 |
| JP | 06276394 | 9/1994 |

(Continued)

OTHER PUBLICATIONS

English Translation of Office Action for Chinese Patent Application No. 200810212373.X, Entitled: Decoding Variable Length Codes in JPEG Applications.

(Continued)

*Primary Examiner* — Samir Ahmed

(57) ABSTRACT

An approach to decoding Huffman symbols in JPEG images is described. One approach involves a method of decoding Huffman codes in a JPEG image file. This method involves obtaining a bitstream sample from a bitstream associated with the JPEG image file. The bitstream sample is compared against a threshold value, to identify a Huffman group number. Information associated with a Huffman group is retrieved, and used to extract the current Huffman symbol from the bitstream. A corresponding symbol value can then be obtained, using the current Huffman symbol and the group information.

18 Claims, 9 Drawing Sheets

Flowchart 700

(56) References Cited

U.S. PATENT DOCUMENTS

| | | | |
|---|---|---|---|
| 6,041,403 A | 3/2000 | Parker et al. | |
| 6,047,357 A | 4/2000 | Bannon et al. | |
| 6,144,322 A | 11/2000 | Sato | |
| 6,157,741 A | 12/2000 | Abe et al. | |
| 6,161,531 A | 12/2000 | Hamburg et al. | |
| 6,246,347 B1 | 6/2001 | Bakhmutsky | |
| 6,298,370 B1 | 10/2001 | Tang et al. | |
| 6,317,063 B1 | 11/2001 | Matsubara | |
| 6,339,658 B1 | 1/2002 | Moccagatta et al. | |
| 6,441,757 B1 | 8/2002 | Hirano | |
| 6,456,340 B1 | 9/2002 | Margulis | |
| 6,462,744 B1 | 10/2002 | Mochida et al. | |
| 6,480,489 B1 | 11/2002 | Muller et al. | |
| 6,507,614 B1 | 1/2003 | Li | |
| 6,543,023 B2 | 4/2003 | Bessios | |
| 6,552,673 B2 | 4/2003 | Webb | |
| 6,563,440 B1 * | 5/2003 | Kangas | 341/65 |
| 6,563,441 B1 * | 5/2003 | Gold | 341/67 |
| 6,577,681 B1 * | 6/2003 | Kimura | 375/240.2 |
| 6,587,057 B2 | 7/2003 | Scheuermann | |
| 6,654,539 B1 | 11/2003 | Duruz et al. | |
| 6,675,282 B2 | 1/2004 | Hum et al. | |
| 6,696,992 B1 | 2/2004 | Chu | |
| 6,738,522 B1 | 5/2004 | Hsu et al. | |
| 6,757,437 B1 | 6/2004 | Keith et al. | |
| 6,795,503 B2 | 9/2004 | Nakao et al. | |
| 6,839,624 B1 | 1/2005 | Beesley et al. | |
| 6,891,976 B2 | 5/2005 | Zheltov et al. | |
| 6,981,073 B2 | 12/2005 | Wang et al. | |
| 7,016,547 B1 * | 3/2006 | Smirnov | 382/245 |
| 7,051,123 B1 | 5/2006 | Baker et al. | |
| 7,068,407 B2 | 6/2006 | Sakai et al. | |
| 7,068,919 B2 | 6/2006 | Ando et al. | |
| 7,069,407 B1 | 6/2006 | Vasudevan et al. | |
| 7,074,153 B2 | 7/2006 | Usoro et al. | |
| 7,113,115 B2 | 9/2006 | Partiwala et al. | |
| 7,113,546 B1 | 9/2006 | Kovacevic et al. | |
| 7,119,813 B1 | 10/2006 | Hollis et al. | |
| 7,129,862 B1 | 10/2006 | Shirdhonkar et al. | |
| 7,132,963 B2 | 11/2006 | Pearlstein et al. | |
| 7,158,539 B2 | 1/2007 | Zhang et al. | |
| 7,209,636 B2 | 4/2007 | Imahashi et al. | |
| 7,230,986 B2 | 6/2007 | Wise et al. | |
| 7,248,740 B2 | 7/2007 | Sullivan | |
| 7,286,543 B2 | 10/2007 | Bass et al. | |
| 7,289,047 B2 | 10/2007 | Nagori | |
| 7,324,026 B2 | 1/2008 | Puri et al. | |
| 7,327,378 B2 | 2/2008 | Han et al. | |
| 7,366,240 B2 | 4/2008 | Chiang Wei Yin et al. | |
| 7,372,378 B2 | 5/2008 | Sriram | |
| 7,372,379 B1 | 5/2008 | Jia et al. | |
| 7,404,645 B2 | 7/2008 | Margulis | |
| 7,432,835 B2 | 10/2008 | Ohashi et al. | |
| 7,496,234 B2 | 2/2009 | Li | |
| 7,606,313 B2 | 10/2009 | Raman et al. | |
| 7,627,042 B2 | 12/2009 | Raman et al. | |
| 7,660,352 B2 | 2/2010 | Yamane et al. | |
| 7,724,827 B2 * | 5/2010 | Liang et al. | 375/240.23 |
| 7,765,320 B2 | 7/2010 | Vehse et al. | |
| 8,502,709 B2 * | 8/2013 | Jia | 341/67 |
| 2001/0010755 A1 | 8/2001 | Ando et al. | |
| 2001/0026585 A1 | 10/2001 | Kumaki | |
| 2002/0063807 A1 | 5/2002 | Margulis | |
| 2002/0094031 A1 | 7/2002 | Ngai et al. | |
| 2002/0135683 A1 | 9/2002 | Tamama et al. | |
| 2003/0043919 A1 | 3/2003 | Haddad | |
| 2003/0067977 A1 | 4/2003 | Chu et al. | |
| 2003/0142105 A1 | 7/2003 | Lavelle et al. | |
| 2003/0156652 A1 | 8/2003 | Wise et al. | |
| 2003/0179706 A1 | 9/2003 | Goetzinger et al. | |
| 2003/0191788 A1 | 10/2003 | Auyeung et al. | |
| 2003/0196040 A1 | 10/2003 | Hosogi et al. | |
| 2004/0028142 A1 | 2/2004 | Kim | |
| 2004/0056787 A1 | 3/2004 | Bossen | |
| 2004/0059770 A1 | 3/2004 | Bossen | |
| 2004/0067043 A1 | 4/2004 | Duruoz et al. | |
| 2004/0081245 A1 | 4/2004 | Deeley et al. | |
| 2004/0096002 A1 | 5/2004 | Zdepski et al. | |
| 2004/0130553 A1 | 7/2004 | Ushida et al. | |
| 2004/0145677 A1 | 7/2004 | Raman et al. | |
| 2004/0158719 A1 | 8/2004 | Lee et al. | |
| 2005/0008331 A1 | 1/2005 | Nishimura et al. | |
| 2005/0123274 A1 | 6/2005 | Crinon et al. | |
| 2005/0147375 A1 | 7/2005 | Kadono | |
| 2005/0182778 A1 | 8/2005 | Heuer et al. | |
| 2005/0207497 A1 | 9/2005 | Rovati et al. | |
| 2006/0013321 A1 | 1/2006 | Sekiguchi et al. | |
| 2006/0067582 A1 | 3/2006 | Bi et al. | |
| 2006/0083306 A1 | 4/2006 | Hsu | |
| 2006/0133500 A1 | 6/2006 | Lee et al. | |
| 2006/0176960 A1 | 8/2006 | Lu et al. | |
| 2006/0215916 A1 | 9/2006 | Kimura | |
| 2006/0256120 A1 | 11/2006 | Ushida et al. | |
| 2007/0006060 A1 | 1/2007 | Walker | |
| 2007/0288971 A1 | 12/2007 | Cragun et al. | |
| 2008/0162860 A1 | 7/2008 | Sabbatini et al. | |
| 2008/0317138 A1 | 12/2008 | Jia | |
| 2009/0196356 A1 | 8/2009 | Houki | |

FOREIGN PATENT DOCUMENTS

| | | |
|---|---|---|
| JP | 09261647 | 10/1997 |
| JP | 2000049621 | 2/2000 |
| KR | 1020030016859 | 3/2003 |
| TW | 200428879 | 11/2004 |
| TW | 200520535 | 12/2009 |
| WO | 0124425 | 4/2001 |

OTHER PUBLICATIONS

Non Final Office Action, Mail Date Jul. 20, 2009; U.S. Appl. No. 11/901,484.

English Translation of Office Action for Chinese Patent Application No. 200810212373.X, Entitled: Decoding Variable Length Codes in JPEG Applications Mar. 10, 2010.

Miska Hannuksela, Picture Decoding Method, USPTO Provisional Application filed Feb. 18, 2003; U.S. Appl. No. 60/448,189.

Ting-Kun Yeh et al., Video Decoder, USPTO Provisional Application filed Dec. 3, 2003; U.S. Appl. No. 60/526,294.

* cited by examiner

| VLC Symbol | Symbol Value |
|---|---|
| 201 → 00 | 0 ← 202 |
| 203 → 010 | 1 ← 204 |
| 205 → 011 | 2 ← 206 |
| 207 → 100 | 3 ← 208 |
| 209 → 101 | 4 ← 210 |
| 211 → 110 | 5 ← 212 |
| 213 → 1110 | 6 ← 214 |
| 215 → 11110 | 7 ← 216 |
| 217 → 111110 | 8 ← 218 |
| 219 → 1111110 | 9 ← 220 |
| 221 → 11111110 | 10 ← 222 |
| 223 → 111111110 | 11 ← 224 |

Huffman Table 200

FIG. 2

| Nbits | Threshold | Offset |
|---|---|---|
| 1 | | |
| 422 → 2 | 0000000000000000 ▼——432 | <Table 2 Address> ▼——442 |
| 423 → 3 | 0100000000000000 ▼——433 | <Table 2 Address +1> ▼——443 |
| 424 → 4 | 1110000000000000 ▼——434 | <Table 2 Address +6> ▼——444 |
| 425 → 5 | 1111000000000000 ▼——435 | <Table 2 Address +7> ▼——445 |
| 426 → 6 | 1111100000000000 ▼——436 | <Table 2 Address +8> ▼——446 |
| 427 → 7 | 1111110000000000 ▼——437 | <Table 2 Address +9> ▼——447 |
| 428 → 8 | 1111111000000000 ▼——438 | <Table 2 Address +10> ▼——448 |
| 429 → 9 | 1111111100000000 ▼——439 | <Table 2 Address +11> ▼——449 |
| 10 | | |
| 11 | | |
| 12 | | |
| 13 | | |
| 14 | | |
| 15 | | |
| 16 | | |

Base Table 400

FIG. 4

| Memory Address | Symbol Value |
|---|---|
| <Table 2 Address> | 0 |
| <Table 2 Address +1> | 1 |
| <Table 2 Address +2> | 2 |
| <Table 2 Address +3> | 3 |
| <Table 2 Address +4> | 4 |
| <Table 2 Address +5> | 5 |
| <Table 2 Address +6> | 6 |
| <Table 2 Address +7> | 7 |
| <Table 2 Address +8> | 8 |
| <Table 2 Address +9> | 9 |
| <Table 2 Address +10> | 10 |
| <Table 2 Address +11> | 11 |

Secondary Table 500

FIG. 5

Flowchart 600

Flowchart 700

System 900

DECODING VARIABLE LENGTH CODES IN JPEG APPLICATIONS

BACKGROUND

1. Field of the Invention

Embodiments of the present invention relate to decoding variable length codes (VLC) used in Joint Photographic Experts Group (JPEG) image files.

2. Related Art

In computing applications, variable length coding (VLC) encoding schemes allow for lossless data compression. In general, VLC encoding schemes utilize a probabilistic approach, where the more common symbols require fewer bits to express than the less common symbols. VLC encoding is used extensively throughout computing, and particularly in media applications, such as images, music, and video, where the uncompressed information would require far more storage space than a compressed version.

One VLC encoding scheme is Huffman coding. Huffman coding is an extremely efficient means of compressing data, particularly when the item to be compressed is used to help generate the corresponding Huffman tree, by using the occurrence of values within the source material to determine where in the Huffman tree each symbol value should appear. Huffman coding also offers an advantage, in that it generates prefix free codes, sometimes called prefix codes; that is, no symbol generated by a Huffman tree will correspond to a prefix of any other symbol generated by that Huffman tree.

Huffman coding is used extensively throughout media applications, and in particular in the Joint Photographic Experts Group (JPEG) image file format. Every JPEG uses Huffman coding to compress data, and, correspondingly, every JPEG viewer must process the Huffman coding to decompress the image. The more efficiently a JPEG viewer can process Huffman coding, the faster the decoding process.

The JPEG standard allows for different Huffman tables for every image. The frequency of occurrence of every value in the image is determined, and those frequencies are used to generate unique Huffman tables for that image. As such, in order for a viewer to decode a JPEG image, the necessary information to reconstruct the Huffman tables is included in the file itself, as part of the file header.

SUMMARY

An approach to decoding Huffman symbols in JPEG images is described. One approach involves a method of decoding Huffman codes in a JPEG image file. This method involves obtaining a bitstream sample from a bitstream associated with the JPEG image file. The bitstream sample is compared against a threshold value, to identify a Huffman group number. Information associated with a Huffman group is retrieved, and used to extract the current Huffman symbol from the bitstream. A corresponding symbol value can then be obtained, using the current Huffman symbol and the group information.

Another approach is described, in which a system is used to decode Huffman codes in a JPEG image file. The system includes a controller module, for performing operations on the JPEG image file. A Huffman table generator is used to generate a base table and a secondary table from information included in the JPEG image file. A bitstream buffer can then be used to store a data excerpt from image data included in the JPEG image file, and a number of threshold comparators are used to identify a Huffman group corresponding to a current Huffman symbol. The controller module can obtain group information associated with the Huffman group, and use the group information to obtain a symbol value corresponding to the current Huffman symbol.

Another approach describes a method of decoding Huffman variable length codes in a JPEG image file. This method involves scanning 16 bits from a bitstream associated with the JPEG image file into a bitstream buffer. A Huffman group corresponding to a current Huffman symbol is identified, and group information associated with that Huffman group is retrieved from a base table. A symbol value for the current Huffman symbol is obtained from a secondary table, with reference to the group information.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 2 depicts an exemplary Huffman table, in accordance with one embodiment.

FIG. 4 depicts a base table, in accordance with one embodiment.

FIG. 5 depicts a secondary table, in accordance with one embodiment.

DETAILED DESCRIPTION

Figure 1:
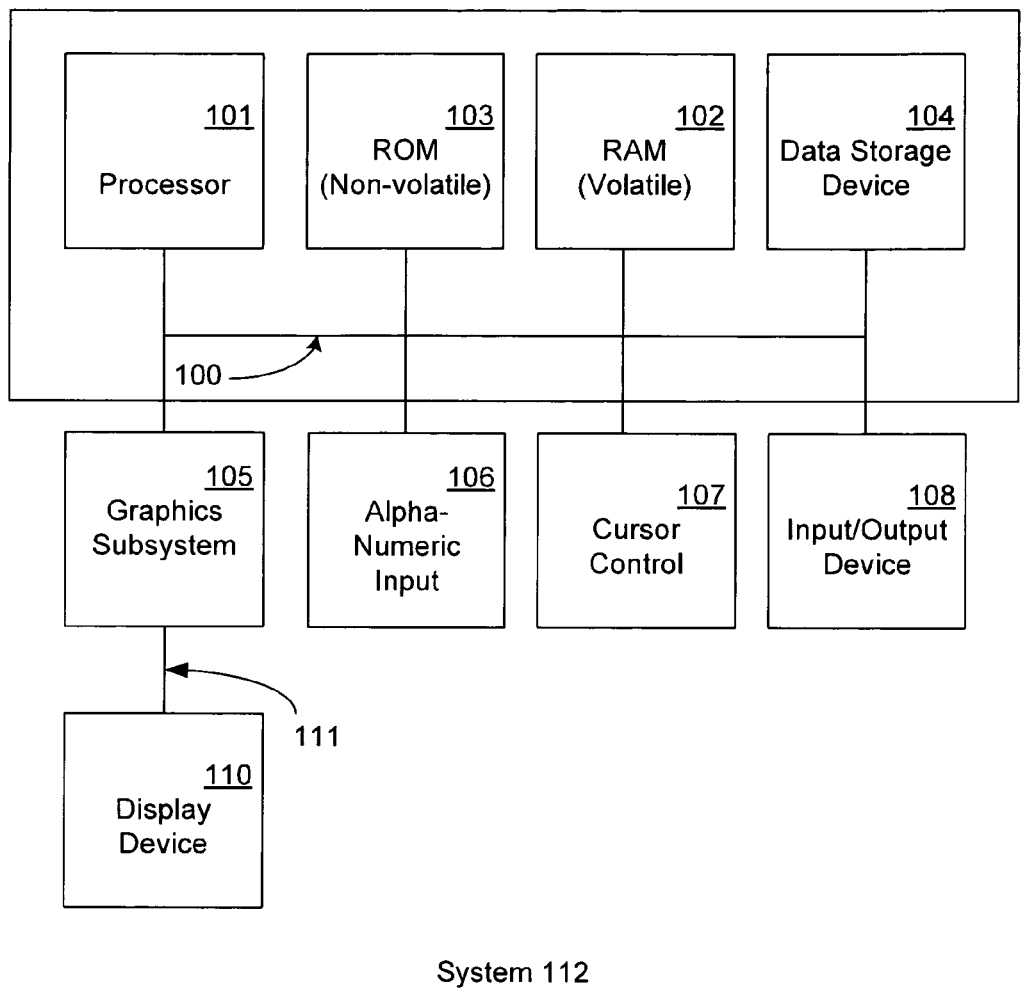
FIG. 1 is a block diagram of an exemplary computer system upon which embodiments of the present invention may be implemented.

Reference will now be made in detail to several embodiments of the invention. While the invention will be described in conjunction with the alternative embodiment(s), it will be understood that they are not intended to limit the invention to these embodiments. On the contrary, the invention is intended to cover alternative, modifications, and equivalents, which may be included within the spirit and scope of the invention as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in figures herein (e.g., FIG. 5) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices typically include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in a modulated data signals such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Some embodiments may be described in the general context of computer-executable instructions, such as program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Although embodiments described herein may make reference to a CPU and a GPU as discrete components of a computer system, those skilled in the art will recognize that a CPU and a GPU can be integrated into a single device, and a CPU and GPU may share various resources such as instruction logic, buffers, functional units and so on; or separate resources may be provided for graphics and general-purpose operations. Accordingly, any or all of the circuits and/or functionality described herein as being associated with GPU could also be implemented in and performed by a suitably configured CPU.

Further, while embodiments described herein may make reference to a GPU, it is to be understood that the circuits and/or functionality described herein could also be implemented in other types of processors, such as general-purpose or other special-purpose coprocessors, or within a CPU.

Basic Computing System

Referring now to FIG. 1, a block diagram of an exemplary computer system 112 is shown. It is appreciated that computer system 112 described herein illustrates an exemplary configuration of an operational platform upon which embodiments may be implemented to advantage. Nevertheless, other computer systems with differing configurations can also be used in place of computer system 112 within the scope of the present invention. That is, computer system 112 can include elements other than those described in conjunction with FIG. 1. Moreover, embodiments may be practiced on any system which can be configured to enable it, not just computer systems like computer system 112. It is understood that embodiments can be practiced on many different types of computer system 112. System 112 can be implemented as, for example, a desktop computer system or server computer system having a powerful general-purpose CPU coupled to a dedicated graphics rendering GPU. In such an embodiment, components can be included that add peripheral buses, specialized audio/video components, IO devices, and the like.

Similarly, system 112 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan. System 112 can also be implemented as a "system on a chip", where the electronics (e.g., the components 101, 103, 105, 106, and the like) of a computing device are wholly contained within a single integrated circuit die. Examples include a hand-held instrument with a display, a car navigation system, a portable entertainment system, and the like.

Computer system 112 comprises an address/data bus 100 for communicating information, a central processor 101 coupled with bus 100 for processing information and instructions; a volatile memory unit 102 (e.g., random access memory [RAM], static RAM, dynamic RAM, etc.) coupled with bus 100 for storing information and instructions for central processor 101; and a non-volatile memory unit 103 (e.g., read only memory [ROM], programmable ROM, flash memory, etc.) coupled with bus 100 for storing static information and instructions for processor 101. Moreover, computer system 112 also comprises a data storage device 104 (e.g., hard disk drive) for storing information and instructions.

Computer system 112 also comprises an optional graphics subsystem 105, an optional alphanumeric input device 106, an optional cursor control or directing device 107, and signal communication interface (input/output device) 108. Optional alphanumeric input device 106 can communicate information and command selections to central processor 101. Optional cursor control or directing device 107 is coupled to bus 100 for communicating user input information and command selections to central processor 101. Signal communication interface (input/output device) 108, which is also coupled to bus 100, can be a serial port. Communication interface 108 may also include wireless communication mechanisms. Using communication interface 108, computer system 112 can be communicatively coupled to other computer systems over a communication network such as the Internet or an intranet (e.g., a local area network), or can receive data (e.g., a digital television signal). Computer system 112 may also comprise graphics subsystem 105 for presenting information to the computer user, e.g., by displaying information on an attached display device 110, connected by a video cable 111. In some embodiments, graphics subsystem 105 is incorporated into central processor 101. In other embodiments, graphics subsystem 105 is a separate, discrete component. In other embodiments, graphics subsystem 105 is incorporated into another component. In other embodiments, graphics subsystem 105 is included in system 112 in other ways.

Efficient VLC Handling in JPEG Applications

In the following embodiment, an approach is described for efficiently handling variable length coding (VLC), and particularly Huffman coding, in JPEG image viewing applications. In one embodiment, a method for processing Huffman codes in a JPEG image is described, which involves efficiently extracting a VLC symbol from a JPEG bitstream, and matching the VLC symbol with its corresponding symbol value.

Several of the embodiments described herein take advantage of several features of the JPEG file format, and its corresponding use of Huffman tables. First, the maximum length Huffman code allowed for a JPEG image is 16 bits. Second, every Huffman table used with JPEG image defines 16 Huffman groups, where a group is defined by the length of the symbols within the group; e.g., the first group consists of symbols one bit in length, the second group consists of symbols two bits in length, and so on, up to the 16th group, which consists of symbols 16 bits in length. Third, as noted previously, Huffman codes are prefix free codes. Fourth, within each Huffman group, code values are consecutive. Utilization of these features allows for an efficient approach to handling Huffman coding.

Exemplary Huffman Codes

While the JPEG standard allows for every image to have its own, uniquely calculated Huffman tables, several "typical" tables are provided by the JPEG committee. One such typical table is the DC luminance table specified by the arrays depicted below, in Table 1.

TABLE 1 dc_luminance_bits[ ] = { 0, 1, 5, 1, 1, 1, 1, 1, 1, 0, 0, 0, 0, 0, 0, 0 }
dc_luminance_val[ ] = { 0, 1, 2, 3, 4, 5, 6, 7, 8, 9, 10, 11 }

The first array, dc_luminance_bits[ ], specifies how the Huffman codes are assigned in the corresponding table, by indicating how many symbols are present in each of the 16 Huffman groups used by JPEG. In this table, only groups two through nine, corresponding to symbols between two and nine bits in length, have entries. Group 3, made up of symbols three bits in length, has five symbols; the remainder have one each. Groups 1 and 10-16 are defined as each having zero entries.

The second array, dc_luminance_val[ ], provides the values to be associated with the symbols, in the order they are to be assigned. In this table, 0 is associated with the first symbol, 1 with the second, and so on.

With reference now to FIG. 2, an exemplary Huffman table 200 is provided. Huffman table 200, as shown, corresponds to the DC luminance table defined by Table 1. The left column consists of the Huffman symbols specified by the dc_luminance_bits[ ] array, symbols 201, 203, 205, 207, 209, 211, 213, 215, 217, 219, 221, and 223. The right column consists of the values associated with the symbols by the dc_luminance_val[ ] array, symbol values 202, 204, 206, 208, 210, 212, 214, 216, 218, 220, 222, and 224. As noted previously, Huffman codes are prefix free codes; when depicted left justified, as shown in FIG. 2, it is easy to see that no symbol is identical to the prefix of another symbol; e.g., symbol 201 is 00, and no other symbol begins with 00.

Jpeg File Format

Figure 3:
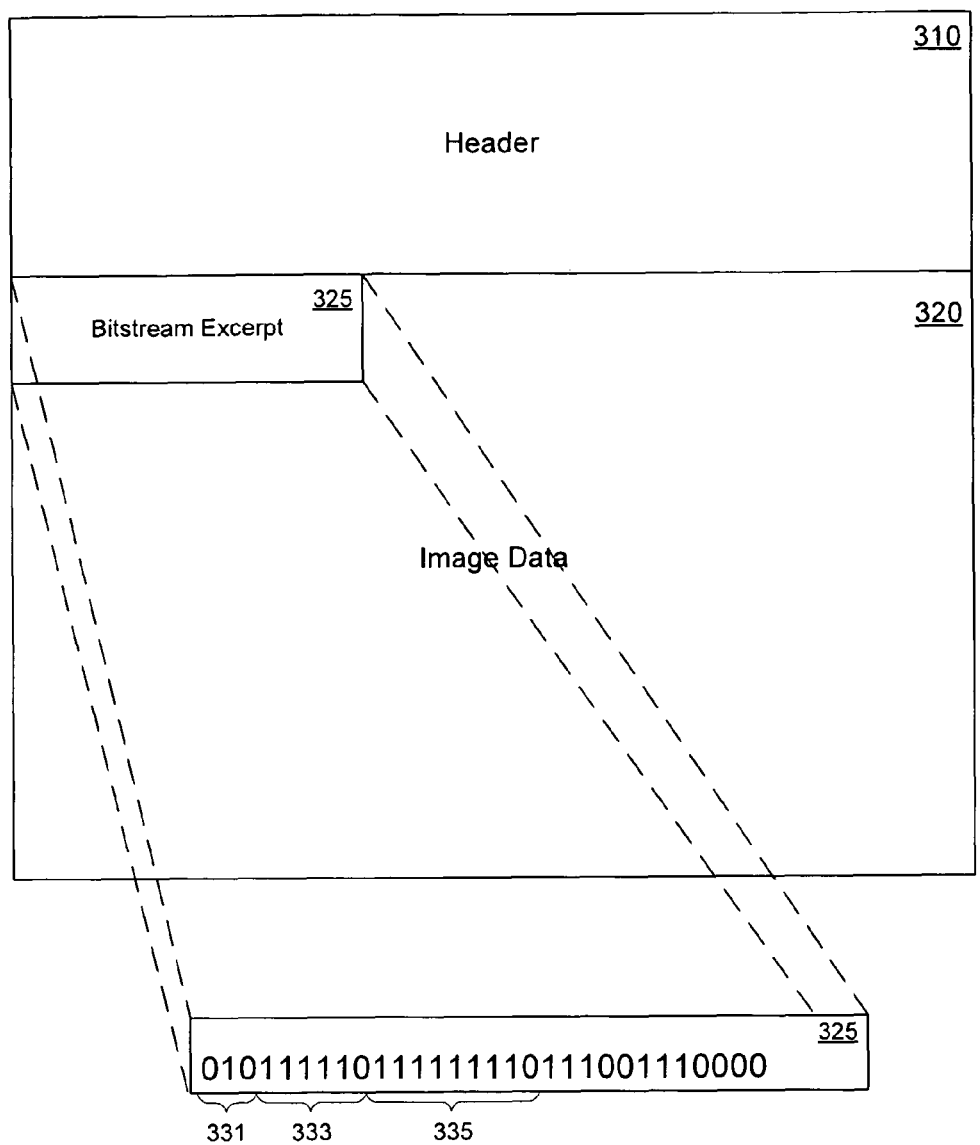
FIG. 3 is a depiction of a JPEG image file, in accordance with one embodiment.

With reference now to FIG. 3, a depiction of a JPEG image file 300 is shown, in accordance with one embodiment. As shown, JPEG image file 300 consists of two sections: a header 310; and the image data 320. Header 310 includes information necessary to decode the image contained in JPEG image file 300, while image data 320 includes the actual compressed image data. For example, header 310 may include an initial sequence, identifying JPEG image file 300 as being a JPEG image file, as well as a section containing Huffman table information for JPEG image file 300, such as the arrays presented in Table 1.

Image data 320, as shown, consists of a bitstream of compressed symbol data. An exemplary excerpt of this bitstream data is shown as bitstream excerpt 325. Bitstream excerpt 325, in the depicted embodiment, is made up of several VLC symbols strung together, e.g., symbols 331, 333, and 335. Because the symbols are variable in length, it is necessary for a JPEG viewer to recognize each complete symbol, regardless of length.

Traditional Approaches

A common prior art approach to handling Huffman codes in JPEG image files involved reading in several bits from the bitstream, often three, and comparing those bits with a table stored in memory. If those bits constituted a complete symbol, the table would so indicate, and provide the value associated with the symbol. If those bits were not a complete symbol, the table would indicate that as well, and include a reference to another table. Further bits would be read from the bitstream, and the second table referenced, with the same potential results. This repeated looping cycle is inefficient, in terms of processing time, repeated memory accesses, and usage of memory to store multiple tables for all but the most trivial of cases.

The Base Table and the Secondary Table

The following embodiments describe an approach for more efficient Huffman decoding for JPEG images. One feature of this approach is more efficient utilization of memory, by limiting the usage of memory tables. For all but the most trivial of cases, the use of the base and secondary tables represents a substantial improvement in terms of memory usage.

With reference to FIG. 4, a base table 400 is depicted, in accordance with one embodiment. Base table 400 is derived from the DC luminance "typical" table information shown above, in Table 1. Base table 400 is broken up into 16 groups, corresponding to the 16 Huffman groups defined by the JPEG standard. Each group contains three pieces of information: nbits, which corresponds to the length of entries, in bits, in a particular group; threshold, which corresponds, in the depicted embodiment, to the lowest value of an entry in that group; and offset, which is a memory pointer to a position in the secondary table, where the symbol values for entries in that group are stored. As discussed above, only groups two through nine have entries in the DC luminance typical table.

The threshold values depicted in base table 400 have been "padded" with zeroes, in order to fill them out to 16 bits in length. In some embodiments, as described in greater detail below, it is advantageous for the threshold values to be equally long, e.g., as long as the longest possible Huffman code.

With reference to FIG. 5, a secondary table 500 is depicted, in accordance with one embodiment. Secondary table 500, in the depicted embodiment, is derived from the DC luminance "typical" table information shown above, in Table 1. Secondary table 500 is a listing of symbol values, corresponding to the Huffman symbols encoded in a JPEG bitstream. In some embodiments, these values are stored sequentially in memory, such that any particular entry can be retrieved, with a combination of an offset value and an index. For example, if secondary table 500 begins at memory address <Table 2 Address>, as indicated, using <Table 2 Address> as an offset, and <2*value_length> (where value_length corresponds to the length, in bytes, of an entry in the secondary table) as an index would retrieve the third symbol value stored in secondary table 500.

Decoding Huffman Values for Jpeg Images

Figure 6:
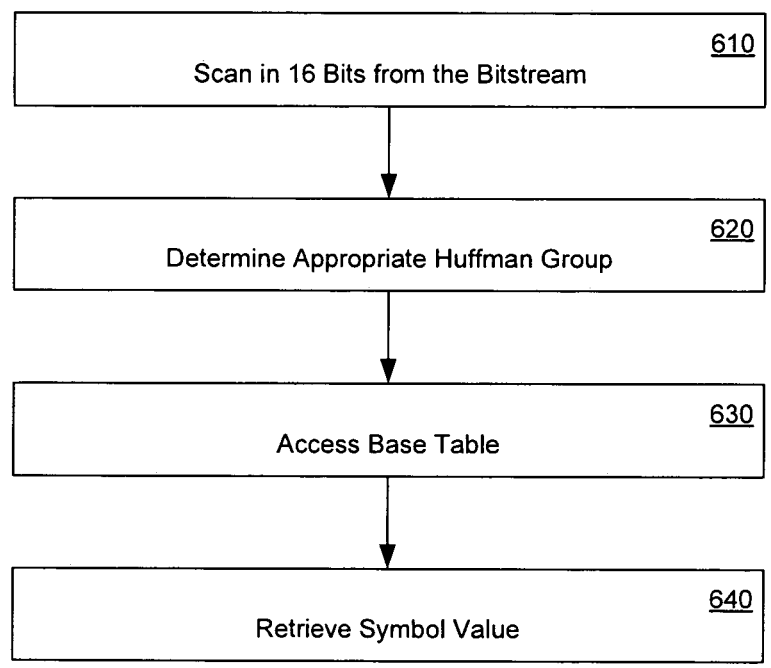
FIG. 6 is a flowchart of a method of decoding Huffman codes in JPEG image files, in accordance with one embodiment.

With reference now to FIG. 6, a flowchart 600 of a method of decoding Huffman codes in JPEG image files is depicted, in accordance with one embodiment. Although specific steps are disclosed in flowchart 600, such steps are exemplary. That is, embodiments of the present invention are well suited to performing various other (additional) steps or variations of the steps recited in flowchart 600. It is appreciated that the steps in flowchart 600 may be performed in an order different than presented, and that not all of the steps in flowchart 600 may be performed.

As shown, step 610 involves scanning in 16 bits from the bitstream. In this embodiment, the maximum possible length of a VLC code is 16 bits. Accordingly, this single scan operation is certain to retrieve a complete symbol from the bitstream. In some embodiment, these bits are placed into a bitstream buffer.

Step 620, in the depicted embodiment, involves determining the appropriate Huffman group for the first symbol in the bitstream buffer. As discussed previously, Huffman codes are prefix free codes. As such, identifying the group in which a particular Huffman symbol belongs will indicate also how many bits long the symbol is. In one approach, the bitstream buffer is compared against 16 different threshold values, each associated with one of the 16 possible Huffman groups used in JPEG encoding. This comparison, which can happen in parallel and very quickly, makes determining the appropriate group, and then the symbol itself, straightforward.

With reference now to step 630, a base table is accessed, and symbol information is retrieved. In some embodiments, two tables are utilized in decoding Huffman symbols. The first table, or base table, contains information about the 16 Huffman groups used in JPEG encoding. In one such embodiment, a "base triplet" is used for each of these 16 groups. The triplet contains the length of entries in that group, e.g., in numbers of bits; a threshold value for that group, which may be used for the comparison performed in step 620; and a memory offset, pointing to a portion of a second memory table where entries for that group may begin. The second table contains symbol values for the various Huffman symbols encoded in the bitstream.

With reference now to step 640, a corresponding symbol value is retrieved. In some embodiments, the base table provides the appropriate offset information for accessing the secondary table. The symbol itself can then be used to provide an index, which, in combination with the offset, allows retrieving a particular symbol value from its location in the secondary table.

Figure 7:
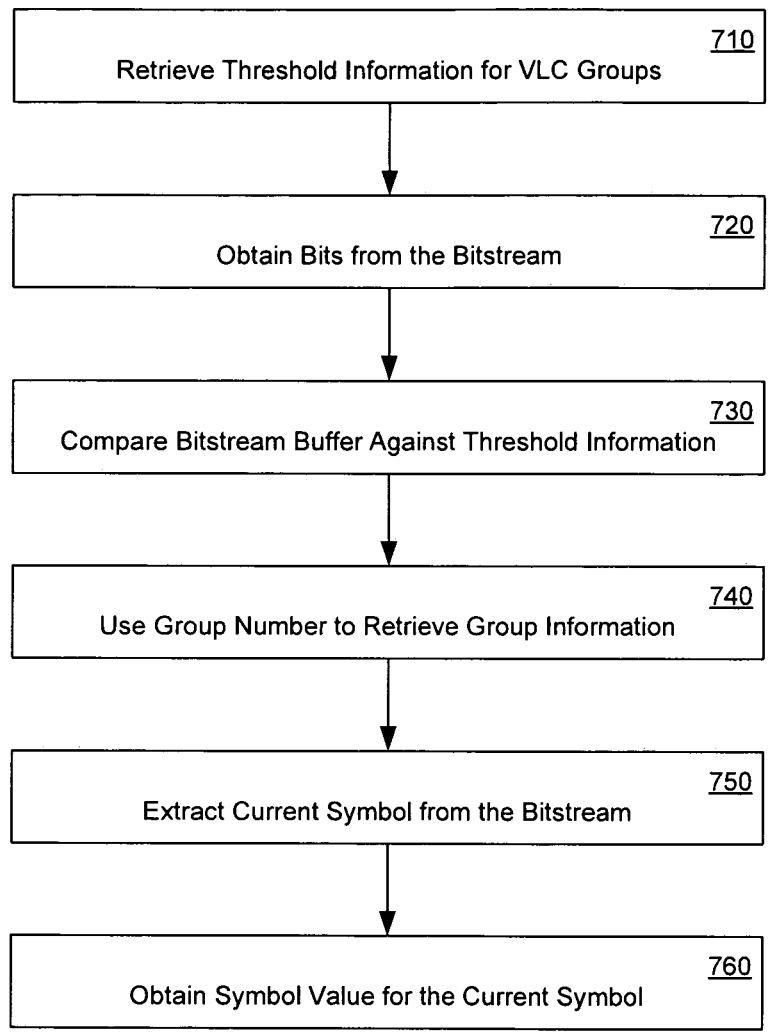
FIG. 7 is a flowchart of a method of decoding a variable length code (VLC) symbol, in accordance with one embodiment.

With reference now to FIG. 7, a flowchart 700 of a method of decoding a variable length code (VLC) symbol is depicted, in accordance with one embodiment. Although specific steps are disclosed in flowchart 700, such steps are exemplary. That is, embodiments of the present invention are well suited to performing various other (additional) steps or variations of the steps recited in flowchart 700. It is appreciated that the steps in flowchart 700 may be performed in an order different than presented, and that not all of the steps in flowchart 700 may be performed.

With reference to step 710, threshold information is retrieved for the VLC groups used during encoding. In some embodiments, this threshold information is obtained from a base table, such as described above with reference to FIG. 4. The threshold information for a given group, in some embodiments, consists of the lowest value of an entry in that group. Further, in some embodiments, the threshold value for a particular group may be "filled" or "padded", such that all thresholds are of equal length.

With reference to step 720, a bitstream is accessed, and a number of bits are obtained from the bitstream. For JPEG bitstreams, the maximum possible VLC symbol length is 16 bits; accordingly, during step 720, 16 bits are obtained from the bitstream, and stored in a bitstream buffer. In different embodiments, different approaches are utilized for obtaining bits. For example, in one embodiment, the bitstream is scanned initially to obtain these 16 bits, while in other embodiments, the bits may be read from the bitstream.

With reference now to step 730, the bitstream buffer is compared against the threshold information, to determine which VLC group the current symbol belongs to. In different embodiments, this step is performed in different ways. In one embodiment, for example, the value stored in the bitstream buffer is compared against the threshold value for each group; if the bitstream buffer is greater than the threshold value for a particular group, the comparison returns "true." Adding up the number of true results will give the group number for the current symbol. In some embodiments, the threshold value for the first VLC group need not be compared against the bitstream buffer; in such an embodiment, every possible value of the bitstream buffer will be equal or greater than the threshold for the first VLC group.

With reference now to step 740, the group number is used to retrieve group information. In some embodiments, the group number serves as an index to the base table. The base table, in turn, contains information regarding the number of bits in length a symbol in a particular group will be, a threshold value corresponding to the smallest entry in that particular group, and a memory offset for a location in a secondary table, where the symbol values for entries in that group are stored.

With reference now to step 750, the current symbol is extracted from the bitstream. In some embodiments, this step is performed by reading the number of bits indicated by the base table from the bitstream. In other embodiments, e.g., where step 720 involves a "read" operation instead of a "scan"

operation, this step may be performed by reading a number of bits indicated by the base table from the bitstream buffer.

With reference now to step 760, the symbol value corresponding to the current symbol is obtained. In some embodiments, the symbol values are stored in a secondary table. In one such embodiment, an index to the secondary table is calculated by using the current symbol, the threshold value for their group, and the offset value for the group. An example of such a calculation is depicted below, in Table 2.

TABLE 2 index = symbol − (threshold >> nBits) + offset

Exemplary VLC Decoding

With reference to FIGS. 8A through 8D, an exemplary VLC decoding process is depicted, in accordance with one embodiment. FIGS. 8A through 8D show operations on a bitstream 825, in accordance with the method of flowchart 700.

Figure 8A:
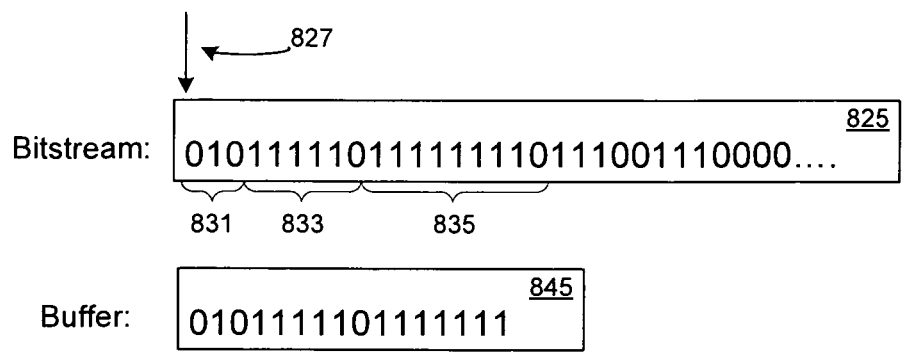
FIGS. 8A, 8B, 8C, and 8D depicts an exemplary VLC decoding process on a bitstream, in accordance with one embodiment.

As shown in FIG. 8A, bitstream 825 is made up of several variable length symbols strung together. The first 16 bits of bitstream 825 are scanned into a buffer 845. In the depicted embodiment, because a scan operation has been used, bitstream memory pointer 827 is not moved. In another embodiment, e.g., where a read operation is used, bitstream memory pointer 827 may move to the end of the accessed portion of the bitstream.

The contents of buffer 845 are then compared with a number of threshold values, e.g., the threshold values depicted in base table 400: threshold values 432 through 439. Every comparison where buffer 845 is greater than or equal to the threshold value returns 1 (true). Note that in the depicted embodiment, as previously described, it is not necessary to compare the buffer against the threshold for group 1; in this embodiment, every possible value of buffer 845 is greater than the threshold for group 1, and so this comparison is automatically treated as 1.

The sum of these true results indicates the VLC group for the current symbol. In the embodiment depicted in FIG. 8A, buffer 845 is greater than threshold values 432 and 433, but less than threshold value 434; as such, the current symbol is in VLC group 3.

The VLC group is used to address the base table, e.g., base table 400, and retrieve the appropriate base triplet; in the depicted embodiment, the base triplet is made up of nbit value 423, threshold 433, and offset 443.

Figure 8B:
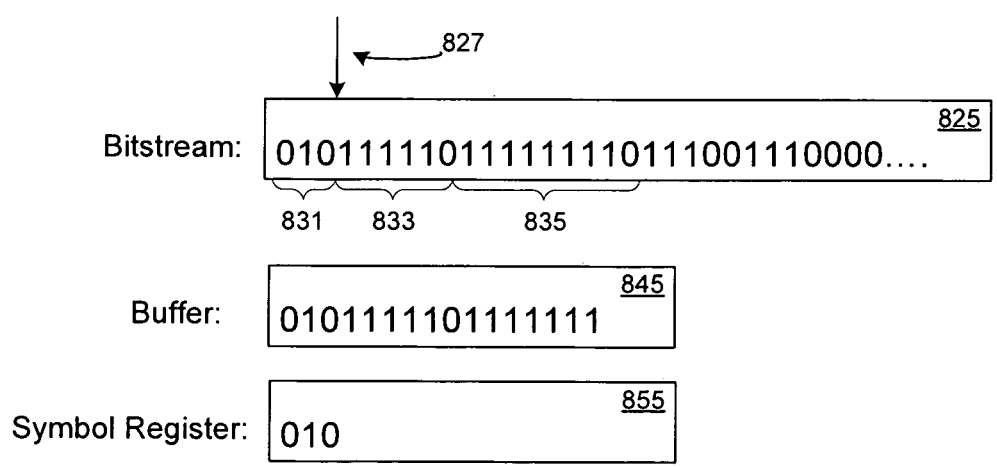

As shown in FIG. 8B, the current symbol is read from bitstream 825, and stored in symbol register 855. The base triplet, and specifically nbit value 423, indicated that the current symbol, symbol 831, was three bits in length. Accordingly, the first three bits of bitstream 825 are read into memory. Because the depicted embodiment involves a read operation, bitstream pointer 827 advances to a position at the end of the read operation. In another embodiment, symbol 831 may be retrieved from buffer 845, rather than bitstream 825. In one such embodiment, a flush operation is used to move bitstream pointer 827.

Symbol 831, in combination with threshold value 433 and offset 443, is used to address secondary table 500. Offset 443 indicates the starting position within secondary table 500 for entries in group 3; symbol 831, in combination with threshold value 433, provides an index value. In the depicted embodiment, symbol 831 corresponds to the first entry in group 3, and its symbol value is stored at memory position <T2addr+1>. The symbol value for symbol 831 is 1.

Figure 8C:
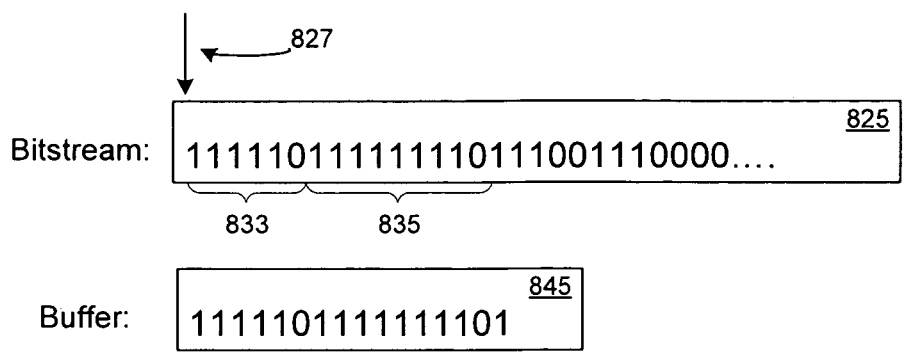
Figure 8D:
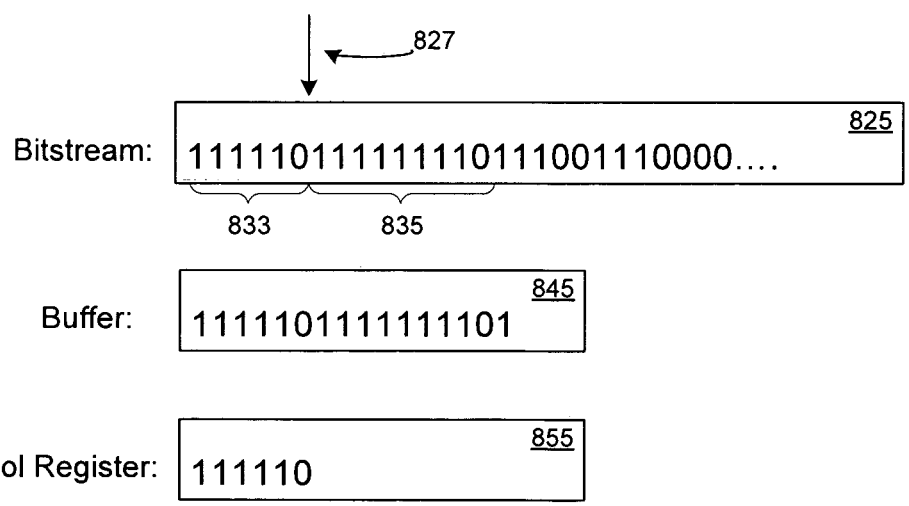

As shown in FIG. 8C, when decoding the next VLC symbol in bitstream 825, e.g., symbol 833, a similar process is followed: the first 16 bits of bitstream 825 are read into buffer 845, and compared against the threshold values, as shown in base table 400. This comparison indicates that the current symbol is a member of group 6, and is six bits in length. The first six bits are then read into symbol register 855, as shown in FIG. 8D, and bitstream pointer 827 advances to the end of symbol 833. Using the base triplet associated with group 6, e.g., nbit value 426, threshold 436, and offset 446, an index is calculated for secondary table 500, and the corresponding symbol value, 8, is retrieved.

System for Jpeg Decoding

Figure 9:
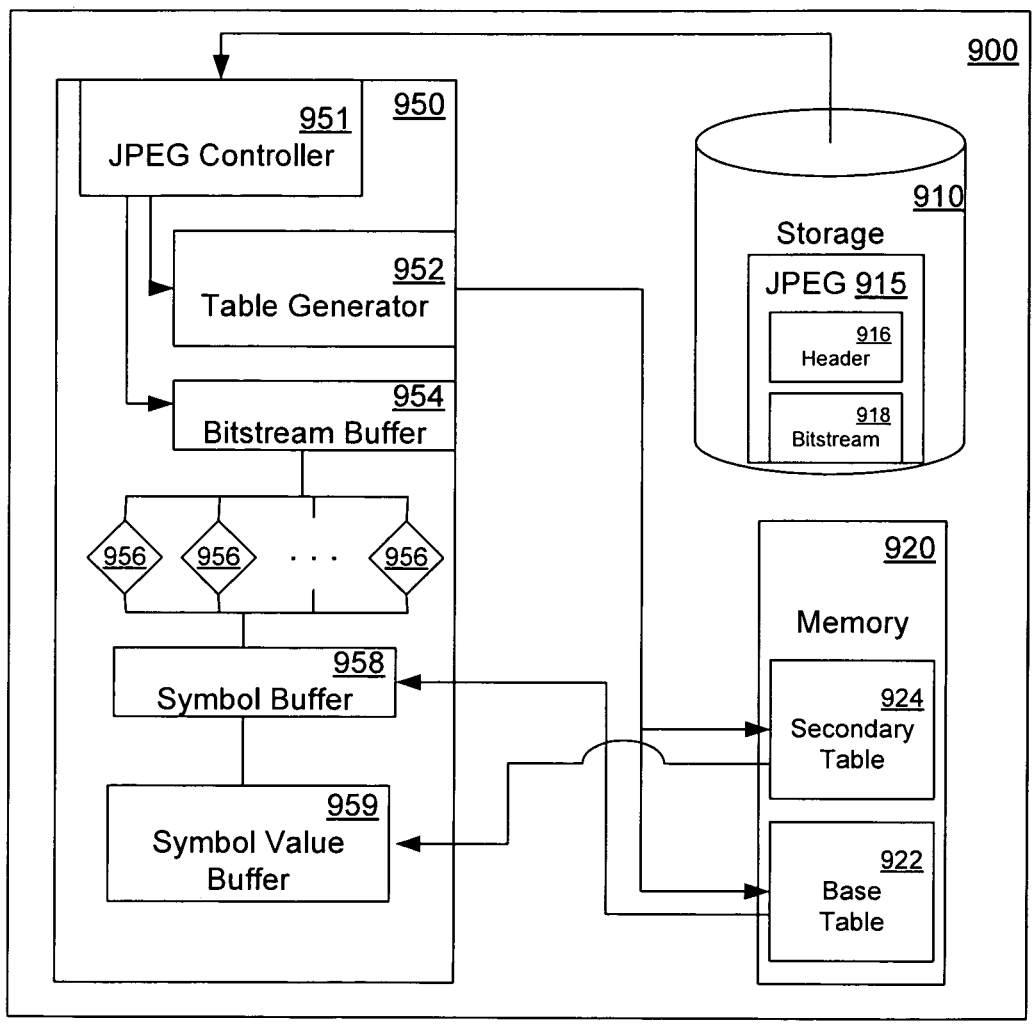
FIG. 9 is a block diagram of a system for JPEG decoding, in accordance with one embodiment.

With reference now to FIG. 9, a system 900 for JPEG decoding is depicted, in accordance with one embodiment. While system 900 is shown as incorporating specific, enumerated features and elements, it is understood that other embodiments are well suited to applications involving additional, fewer, or different features, elements, or arrangements. Moreover, is understood that system 900 may be implemented in hardware, e.g., through use of dedicated electronic components, through software, e.g., as a collection of programmatic modules, or as a combination of these.

System 900 is shown as incorporating storage element 910. Storage element 910 may take different forms, in different embodiments. For example, in one embodiment, storage element 910 is a magnetic hard disk drive. In the depicted embodiment, storage element 910 is shown as storing JPEG file 915. JPEG file 915, as shown, incorporates both header 916, and bitstream 918.

System 900 is also shown as including memory 920. In different embodiments, memory 920 may take different forms. Memory 920, in the depicted embodiment, is used to store base table 922, and secondary table 924.

System 900 is also shown as including JPEG decoding engine 950. In the depicted embodiment, JPEG decoding engine 950 incorporates JPEG controller module 951, Huffman table generator 952, bitstream buffer 954, a plurality of threshold comparators 956, symbol buffer 958, and symbol value buffer 959.

Operation of system 900, according to the depicted embodiment, involves passing JPEG file 915 to JPEG decoding engine 950, where it is received by JPEG controller module 951. Header 916 is passed to Huffman table generator 952, which uses information contained in header 916, e.g., Huffman table information encoded as part of JPEG file 915, to generate base table 922 and secondary table 924. JPEG controller module 951 accesses base table 922, and obtains threshold information for each Huffman group described therein. This threshold information is loaded into the plurality of threshold comparators 956.

A portion of bitstream 918, e.g., the first 16 bits, is loaded into bitstream buffer 954. The contents of bitstream buffer 954 are then compared with each threshold comparator 956; the results of these comparisons will identify the Huffman group of the current symbol. Once the appropriate Huffman group has been determined, group information can be obtained from base table 922. This group information, in turn, allows for the extraction of the current symbol from bitstream 918; the symbol is stored in symbol buffer 958.

The combination of the group information and the symbol is used to access secondary table 924 and extract the symbol value for the current symbol, which can then be stored in symbol value buffer 959.

Embodiments of the present invention are thus described. While the present invention has been described in particular embodiments, it should be appreciated that the present invention should not be construed as limited by such embodiments, but rather construed according to the following claims.

What is claimed is:

1. A method of decoding Huffman codes in a Joint Photographic Experts Group (JPEG) image file, comprising:
   obtaining a bitstream sample from a bitstream associated with said JPEG image file;
   comparing said bitstream sample against a threshold value in a base table, to obtain a Huffman group number;
   retrieving information, from said base table, associated with a Huffman group, using said Huffman group number;
   extracting a current Huffman symbol from said bitstream, using said Huffman group information; and
   obtaining a symbol value from a secondary table, using said current Huffman symbol and said Huffman group information, wherein said base table comprises a plurality of information associated with a plurality of Huffman groups, and said secondary table comprises a plurality of symbol values; and said base table and said secondary table are generated from Huffman table information included in said JPEG image file.

2. The method of claim 1, further comprising:
   accessing said threshold value.

3. The method of claim 1, wherein said Huffman group information comprises:
   bit length information, indicating a length in bits of entries in said Huffman group;
   said threshold value, identifying a smallest Huffman symbol in said Huffman group; and
   a memory offset, for use in obtaining said symbol value from a location in memory.

4. The method of claim 3, wherein said threshold value is padded with zeros, in order to be equal in length to said bitstream sample from said bitstream.

5. The method of claim 3, wherein said obtaining comprises:
   performing a scan operation on said bitstream to obtain said bitstream sample; and
   loading said bitstream sample into a memory buffer.

6. The method of claim 5, wherein said extracting comprises:
   performing a read operation on said bitstream to obtain said current Huffman symbol, with reference to said length information.

7. The method of claim 3, wherein said obtaining comprises:
   performing a read operation on said bitstream to obtain said bitstream sample; and
   loading said bitstream sample into a memory buffer.

8. The method of claim 7, wherein said extracting comprises:
   obtaining said current Huffman symbol from said memory buffer, with reference to said bit length information.

9. The method of claim 1, further comprising:
   comparing said bitstream sample against a plurality of threshold values, each of said plurality of threshold values associated with one of a plurality of Huffman groups.

10. The method of claim 9, further comprising:
    obtaining said plurality of threshold values from said base table.

11. A system for decoding Huffman codes in a Joint Photographic Experts Group (JPEG) image file, comprising:
    a controller module, for performing operations on said JPEG image file;
    a Huffman table generator coupled to said controller module, for generating a base table and a secondary table from Huffman table information included in said JPEG image file;
    a bitstream buffer coupled to said controller module, for storing a data excerpt from image data included in said JPEG image file; and
    a plurality of threshold comparators coupled to said controller module, for identifying, from said base table, a Huffman group corresponding to a current Huffman symbol, wherein said base table comprises a plurality of Huffman group information associated with a plurality of Huffman groups, and said secondary table comprises a plurality of symbol values, and wherein said controller module obtains group information associated with said Huffman group from said base table, and uses said group information to obtain a symbol value, from said secondary table, corresponding to said current Huffman symbol.

12. The system of claim 11, wherein said plurality of Huffman groups comprises 16 Huffman groups.

13. The system of claim 11, wherein each of said plurality of Huffman group information comprises:
    bit length information for each entry in said corresponding Huffman group;
    a threshold value, corresponding to a lowest symbol in said corresponding Huffman group; and
    an offset, corresponding to a location in said secondary table.

14. The system of claim 13, wherein said plurality of threshold values are loaded into said plurality of threshold comparators, and compared against said data excerpt stored in said bitstream buffer.

15. A method of decoding Huffman variable length codes in a Joint Photographic Experts Group (JPEG) image file, comprising:
    scanning 16 bits from a bitstream associated with said JPEG image file into a bitstream buffer;
    identifying a Huffman group corresponding to a current Huffman symbol stored in said bitstream buffer by comparing said 16 bits against a threshold value in a base table to obtain a Huffman group number corresponding to said Huffman group;
    retrieving group information associated with said Huffman group from said base table; and
    obtaining a symbol value for said current Huffman symbol from a secondary table, with reference to said group information, wherein said base table comprises a plurality of information associated with a plurality of Huffman groups, and said secondary table comprises a plurality of symbol values; and said base table and said secondary table are generated from Huffman table information included in said JPEG image file.

16. The method of claim 15, wherein said identifying comprises:
    retrieving a plurality of threshold values associated with said plurality of Huffman groups from said base table;
    comparing each of said plurality of threshold values with said bitstream buffer, to produce a plurality of results; and
    identifying said Huffman group with reference to said plurality of results.

17. The method of claim 15, wherein said group information comprises:
    a bit length associated with entries in said Huffman group;
    a threshold value corresponding to a lowest entry in said Huffman group; and a memory offset corresponding to a location in said secondary table.

18. The method of claim 17, wherein said obtaining comprises calculating a memory address with reference to said memory offset, said threshold value, and said current Huffman symbol.

* * * * *